US008706622B2

(12) United States Patent
Winters et al.

(10) Patent No.: US 8,706,622 B2
(45) Date of Patent: Apr. 22, 2014

(54) ACCOUNT HOLDER DEMAND ACCOUNT UPDATE

(75) Inventors: Michelle E. Winters, Belmont, CA (US); Lubna Samad, Foster City, CA (US); Laura DiGioacchino, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 635 days.

(21) Appl. No.: 12/186,369

(22) Filed: Aug. 5, 2008

(65) Prior Publication Data
US 2010/0036769 A1  Feb. 11, 2010

(51) Int. Cl.
*G06Q 40/00* (2012.01)

(52) U.S. Cl.
USPC ............................................. 705/40

(58) Field of Classification Search
USPC ............................................. 705/40
See application file for complete search history.

(56) References Cited

U.S. PATENT DOCUMENTS

| | | | |
|---|---|---|---|
| 3,727,186 A | | 4/1973 | Stephenson et al. |
| 5,146,403 A * | | 9/1992 | Goodman .............................. 1/1 |
| 5,231,569 A | | 7/1993 | Myatt et al. |
| 5,233,655 A | | 8/1993 | Shapiro |
| 5,483,445 A * | | 1/1996 | Pickering ......................... 705/40 |
| 5,581,686 A * | | 12/1996 | Koppolu et al. ............... 715/784 |
| 5,615,408 A | | 3/1997 | Johnson et al. |
| 5,636,211 A | | 6/1997 | Newlin et al. |
| 5,649,118 A | | 7/1997 | Carlisle et al. |
| 5,679,938 A | | 10/1997 | Templeton et al. |
| 5,679,940 A | | 10/1997 | Templeton et al. |
| 5,832,068 A | | 11/1998 | Smith |
| 7,383,230 B2 | | 6/2008 | Wolff |
| 7,529,700 B1 | | 5/2009 | Kessler |
| 7,600,676 B1 | | 10/2009 | Rados et al. |
| 7,620,592 B2 | | 11/2009 | O'Mara et al. |
| 7,809,650 B2 | | 10/2010 | Bruesewitz et al. |
| 7,844,519 B2 * | | 11/2010 | Wehunt et al. ................... 705/35 |
| 2003/0046235 A1 * | | 3/2003 | Lacivita et al. ................. 705/44 |
| 2003/0130919 A1 | | 7/2003 | Templeton et al. |

(Continued)

FOREIGN PATENT DOCUMENTS

| | | |
|---|---|---|
| JP | 2001-243350 | 9/2001 |
| KR | 10-2003-0072193 | 9/2003 |
| KR | 10-2005-0089427 | 9/2005 |
| WO | WO 2007071984 A2 * | 6/2007 |

OTHER PUBLICATIONS

U.S. Appl. No. 11/755,670, filed May 30, 2007, Office Action mailed Nov. 26, 2008.

(Continued)

*Primary Examiner* — Behrang Badii
*Assistant Examiner* — Daniel L Greene
(74) *Attorney, Agent, or Firm* — Kilpatrick Townsend & Stockton LLP (57) ABSTRACT

Account holder identification is used to access and retrieve the account holder's accounts and attributes thereof. A user interface receives a selected account for which merchants having conducted transactions on the selected account are retrieved and displayed on the user interface. The account holder selects which merchants are to receive updated attributes of the selected account, such as a new expiration, a new billing address, a new credit limit, a name change of the account holder, etc. Each user selected merchant is notified of the user selected attributes of the user selected account.

26 Claims, 6 Drawing Sheets

(56) References Cited

U.S. PATENT DOCUMENTS

| | | | |
|---|---|---|---|
| 2003/0138084 A1 | 7/2003 | Lynam et al. | |
| 2003/0195858 A1 | 10/2003 | Watanabe et al. | |
| 2003/0225688 A1* | 12/2003 | Dobbins | 705/39 |
| 2004/0117302 A1* | 6/2004 | Weichert et al. | 705/40 |
| 2004/0133516 A1 | 7/2004 | Buchanan et al. | |
| 2005/0010524 A1 | 1/2005 | Gutbrod et al. | |
| 2005/0021456 A1* | 1/2005 | Steele et al. | 705/39 |
| 2005/0075977 A1 | 4/2005 | Carroll et al. | |
| 2005/0080717 A1 | 4/2005 | Belyi et al. | |
| 2005/0080724 A1 | 4/2005 | Foss, Jr. | |
| 2005/0080728 A1 | 4/2005 | Sobek | |
| 2005/0087594 A1 | 4/2005 | Phillips et al. | |
| 2005/0149455 A1 | 7/2005 | Bruesewitz et al. | |
| 2005/0203842 A1 | 9/2005 | Sanchez et al. | |
| 2005/0246181 A1 | 11/2005 | Kawahara | |
| 2005/0261995 A1 | 11/2005 | Phelan | |
| 2005/0283436 A1 | 12/2005 | Greer et al. | |
| 2005/0289198 A1 | 12/2005 | Todd | |
| 2006/0116954 A1 | 6/2006 | Strayer et al. | |
| 2006/0190734 A1 | 8/2006 | Spitz | |
| 2006/0265602 A1 | 11/2006 | Robinson | |
| 2006/0282381 A1 | 12/2006 | Ritchie | |
| 2007/0156553 A1 | 7/2007 | Zimmerman | |
| 2007/0165803 A1 | 7/2007 | Duan | |
| 2007/0198437 A1 | 8/2007 | Eisner et al. | |
| 2007/0239604 A1 | 10/2007 | O'Connell et al. | |
| 2007/0288933 A1 | 12/2007 | Shariff et al. | |
| 2008/0162338 A1 | 7/2008 | Samuels et al. | |
| 2008/0195530 A1 | 8/2008 | Huennekens et al. | |

OTHER PUBLICATIONS

U.S. Appl. No. 11/755,670, filed May 30, 2007, Response to Office Action filed Feb. 24, 2009.

U.S. Appl. No. 11/755,670, filed May 30, 2007, Final Office Action mailed May 1, 2009.

U.S. Appl. No. 11/755,670, filed May 30, 2007, Response to Final Office Action filed Sep. 1, 2009.

U.S. Appl. No. 11/755,670, filed May 30, 2007, Office Action mailed Dec. 1, 2009.

U.S. Appl. No. 12/267,117, filed Nov. 7, 2008, Office Action mailed Jul. 14, 2009.

U.S. Appl. No. 12/267,117, filed Nov. 7, 2008, Response to Office Action filed Oct. 14, 2009.

U.S. Appl. No. 12/267,117, filed Nov. 7, 2008, Final Office Action mailed Jan. 6, 2010.

U.S. Appl. No. 12/267,237, filed Nov. 7, 2008, Office Action mailed Oct. 26, 2009.

U.S. Appl. No. 12/267,237, filed Nov. 7, 2008, Response to Office Action filed Jan. 26, 2010.

U.S. Appl. No. 12/267,237, filed Nov. 7, 2008, Office Action mailed Apr. 26, 2010.

"TeleCheck to Provide Check Verification to Limited Brands," PR Newswire, Jan. 13, 2003, © 2010 PR Newswire Association Inc.

"STIC Search Report CIC 3600," Aug. 4, 2010.

"Faster Card Transactions Brought to You by FM Radio," ABA Banking Journal, Jul. 1988, vol. No. 80, pp. 20, 22.

"A Lift for Recurring Payments?," Frederick H. Lowe, Credit Card Management, vol. 16, pp. 30-34, Aug. 2003.

Identity theft victim (minor case); BMW Forums; Oct. 4, 2004; Desertnate; 2 pages.

Paymentech publication, "Paymentech introduces Deci$ionable Data, online tool for payment analysis" at www.webarchive.org/web/221004051945/www.paymentech.net/abo_cominf_prerel_decdat_page.jsp (2002) 2 pp.

SIMIC, Dejan; "Reducing Fraud in Electronic Payment Systems"; *7th Balkan Conference on Operational Research "Bacor 05"*; constanta, May 2005, Romania; 11 pages.

Visa DPS/services/Visa Account Updater; 4 pages; Oct. 18, 2006.

\* cited by examiner

ACCOUNT HOLDER DEMAND ACCOUNT UPDATE

FIELD

The present invention relates generally to financial transactions, and more particularly to a customer requesting an update to their account information stored with one or more merchants, and more particularly to techniques for a customer to provide updated information to one or more merchants prior to or incident to a financial transaction, where the financial transaction can be conducted with an electronic payment device, including, but not limited to, a credit card, a prepaid card, or a debit card.

BACKGROUND

Transactions, including credit card transactions, are used for a great number of purchases and sales between merchants and account holders. A normal card transaction, however, involves a number of parties, including an account holder who possesses a card, a merchant, an acquirer, an issuer and a transaction handler. By way of example, and not by way of limitation, a well known transaction handler is the VISA™ card association. The acquirer is a business entity, e.g., a commercial bank, that has a business relationship with the merchant and receives some or all of the transactions from that merchant. The issuer is a business entity which issues the card to the account holder.

In a one type of transaction, an account holder provides certain account information to a merchant that stores that account information. At the time that account information is first provided, or at some future time specified time, the merchant, acquirer, issuer and transaction handler cooperatively determine whether to authorize the account holder's requested transaction. Sometimes, the authorization for the transaction is not received by the merchant because information stored about the account holder's account is not up-to-date. It would be an advance in the art to provide one or more techniques that permit an account holder to update the account information and provide the merchant with that information either before or at the time the merchant receives a denial for authorization.

SUMMARY

In a system with issuers issuing accounts to account holders, each account having one or more attributes, and the account holders conducting transactions with one or more merchants using their accounts, an account holder identification is received from the account holder. An access is made using the received identification to one or more account databases to retrieve one or more of the account holder's accounts and attributes of each account. A user interface is displayed having a user selectable account list populated with the retrieved one or more accounts. A selection of one of the account holder's accounts is received from the user interface. An access is made using the selected account to one or more transaction databases to retrieve a list of transactions that were conduct on the selected account. An access is made using the retrieved list of transactions to one or more merchant databases to retrieve a list of merchants corresponding to the retrieved list of transactions. A user interface is displayed that has a user selectable merchant list populated by the retrieved list of merchants and a user editable field for each of the attributes of the selected account. For each merchant in the retrieved list of merchants and for each of the one or more of the attributes of the selected account, an indicator is received from the user interface. Each indicator identifies whether to send an update of the attribute to the merchant. For each indicator that was received from the user interface, a transmission is formed to contain information that includes the corresponding update of the attribute. The information is for delivery to the corresponding merchant.

In another implementation, a transmission containing account holder identification and one or more account attributes is received. An access is made, using the received account holder identification, to one or more transaction databases to retrieve a list of transactions using one or more of the account attributes, where each transaction was conducted on the account pertaining to the one or more account attributes. An access is made using the list of transactions to one or more merchant databases to retrieve a list of merchants. A user interface is displayed that has a user selectable merchant list populated by the list of merchants and a user editable field for each of the account attributes for providing updated attribute information. One or more selected merchants and updated attribute information are received from the user interface. A transmission is formed to send updated attribute information to the account holder's issuer. A transmission is received from account holder's issuer approving or denying the updated attribute information to the account holder's account. Where the issuer approved of the updated attribute information to the account holder's account, a transmission is formed to contain the updated attribute information for delivery to each selected merchant in the received list of merchants.

BRIEF DESCRIPTION OF DRAWINGS

Implementations of the invention will become more apparent from the detailed description set forth below when taken in conjunction with the drawings, in which like elements bear like reference numerals.

DESCRIPTION

Figure 1:
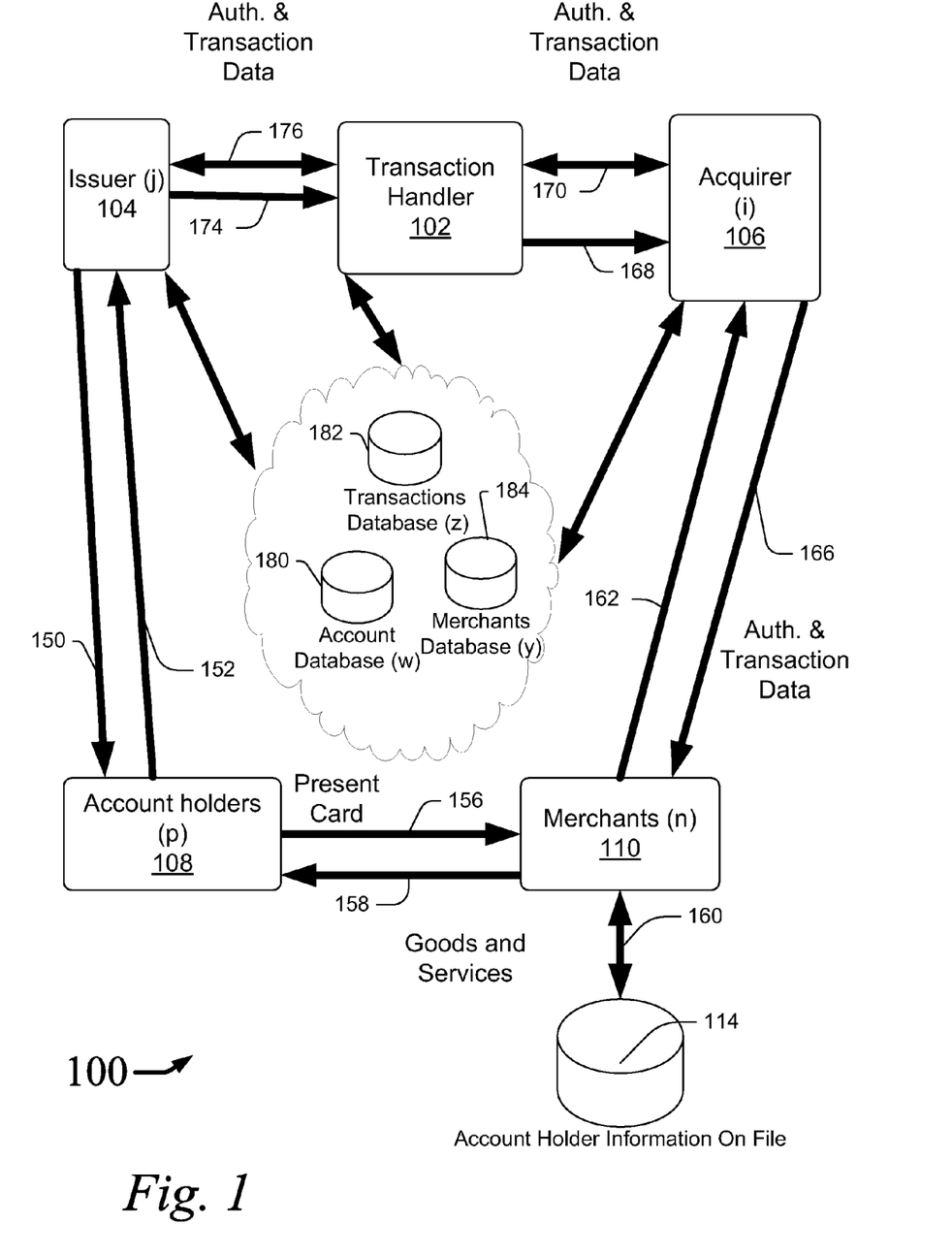
FIG. 1 depicts an exemplary process for the provision of the financial service of authorizing and remunerating electronic payment device transactions (i.e.; credit card transactions)

FIG. 1 is a diagram depicting an exemplary process 100 of a particular financial transaction system. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 110, 108, 106, 104 in FIG. 1 are illustrated with a single box, but indicate one or more elements can be present. For example, issuer (j) 104 is one of a possible plurality of issuers, where j may range from 1 to a large integer.

Account holder (p) 108 presents an electronic payment device (i.e.; a credit card) to a merchant (n) 110 (at step 156) as tender for a financial transaction such as a purchase of goods. Those of skill in the art will recognize that other financial transactions and instruments other than credit cards may also be used, including, but not limited to, a prepaid card, and a debit card. For purposes of illustration and explanation, however, reference will be made to a credit card.

As part of the transaction, the account holder's 108 credit card is typically scanned or swiped through a magnetic card reader by the merchant (n) 110, whereupon account information is read from the card and a request for authorization is transmitted to the merchant's 110 acquirer (i) 106 (at step 166). Each acquirer (i) 106 is a financial organization that processes credit card transactions for businesses, for example merchants, and is licensed as a member of a transaction handler 102 such as a credit card association. As such, each acquirer (i) 106 establishes a financial relationship with one or more merchants (n) 110, and assists in preventing and reporting fraudulent transactions and security-related events.

The acquirer (i) 106 transmits the account information to the transaction handler (TH) 102 (at step 170), who in turn routes the request to the account holder's issuing bank, or Issuer 104 (at step 176). The Issuer 104 returns authorization information to the transaction handler 102 (at step 174) who returns the information to the merchant (n) 110 through the acquirer (i) 106 (at step 162). The Merchant, 110, now knowing whether the Issuer's 104 credit card account is valid and supports a sufficient credit balance, may complete the transaction and the account holder (p) 108 in turn receives goods and/or services in exchange (at step 158). Most credit card associations instruct merchants that, after receiving authorization, the detailed credit card account information obtained from the point of sale magnetic stripe scanner must be deleted.

To reconcile the financial transactions and provide for remuneration, information about the transaction is provided by the merchant (n) 110 to acquirer (i) 106 (at step 162), who in turn routes the transaction data to the transaction handler 102 (at step 170) who then provides the transaction data to the appropriate Issuer 104 (at step 170). The Issuer then provides funding for the transaction to the transaction handler 102 (at step 175) through a settlement bank (not shown). The funds are then forwarded to the merchant's (n) acquirer (i) 106 (at step 168) who in turn pays the merchant (n) 110 for the transaction (at step 166), (less a merchant discount, if applicable). The Issuer 104, then bills the account holder (p) 108 (at step 150), and the account holder (p) 108 pays the Issuer 104 (at step 152), with possible interest or fees.

Merchant (n) 110 may have an on going relationship with one or more account holders (p) 108. This relationship may include storing account information in a transactions data database, such as data storage for each of the merchant's (n) account holders (p) 108 in an 'Account Holder Information On File' database 114. By way of example, and not by way of limitation, a customer may have their credit card account number and expiration date on file in database 114, where merchant (n) 110 is a health club that makes automatic health club monthly membership charges to the customer's account, or where merchant (n) 110 is an automobile rental service that sporadically receives a reservation request for an automobile rental from the customer which reservation is held by the customer's credit card information stored in database 114. Whenever merchant (n) 110 needs to charge the customer's account, merchant (n) 110 accesses and retrieves the customer's account information stored in the database 114 (by path 160). The account information (such as the credit card number and expiration date) is then used in the transaction (as described above) in lieu of requiring the customer to present their electronic payment device at the time of the transaction.

Over time, the information in database 114 may decrease in accuracy. Out of date information in database 114 may cause a transaction (described above) to fail a test for authorization. Account holders 108, according to implementations presented herein, an more or more different kinds of access to the merchants' 110 account holder information on file database 114 such that account information updates received from the account holder (p) 108 can be updated and stored by merchant (n) 110. Of course, the merchant (n) 110 can also receive periodic and or real time updates to information, in which case merchant (n) 110 executes batch operation to send all or a portion of database 114 to the merchant's (n) 110 acquirer (i) 106. The merchant's (n) 110 acquirer (i) 106 then requests a batch update to merchant's (n) 110 database 114 from the transaction handler 102 who receives sporadic and/or periodic updates to accounts for account holders 108 from respective issuers 104. Transaction handler 102 may run each account in database 114 in a batch operation against its account records to determine which accounts, if any, have changed. By way of example, one type of change that may have occurred is that an account that expired has been renewed with a new expiration date. Alternatively, the account may have been closed and a new account opened.

In one implementation, a payment processing system has issuers issuing accounts to account holders, where each account has one or more attributes, and the account holders conduct transactions with one or more merchants using their accounts. In this payment processing system, a user interface is provided to account holders to input an identifier to a web service. The web service allows the account holder to designate select merchants that are to receive selected updated information about each one of the account holder's accounts. The updated information will typically be one or more attributes of each account that has recently been updated. The user interface receives the account holder's identification from the account holder, such as by the account holder, or agent thereof, inputting a social security number, an account number, a login and password, another identifier, etc. Referring to FIG. 1, the account holder (p) 108 makes the input to the user interface.

Thereafter, the received identification is used to access one or more account databases (w) 180 to retrieve one or more of the account holder's accounts and attributes of each account. Optionally, this access may be permitted only upon an authentication of the identification received from the account holder.

Another aspect of the user interface is displayed with a user selectable account list populated with the retrieved account holder's accounts. The account holder (p) 108 makes input to the user interface and a selection of one of the account holder's accounts is received from the user interface. Using the selected account, access is made to one or more transaction databases (z) 182 to retrieve a list of transactions that were conducted on the selected account. Using the retrieved list of transactions, one or more merchant databases (y) 184 are accessed to retrieve a list of merchants corresponding to the retrieved list of transactions.

Another aspect of the user interface is displayed with a user selectable merchant list populated by the retrieved list of merchants and a user editable field for each of the attributes of the selected account. The interface receives input that includes, for each merchant in the retrieved list of merchants, and for each of the one or more of the attributes of the selected account, an indicator whether to send an update of the attribute to the merchant. For each received indicator from the user interface, a transmission is formed to contain information that includes the corresponding update of the attribute. The information, which is for delivery to the corresponding merchant, can also include a notice that the update of the attribute is to be stored by the corresponding merchant in an account on file database (i.e., see reference numeral 114 in FIG. 1).

The above FIG. 1 was described with respect to the process 100 involving a transaction system with parties that include an account holder, a merchant, an issuer, an acquirer, and a transactional hander, other implementations of a more specific nature are also contemplated, particularly a commercial transaction, and more particularly a credit card transaction. Moreover, those of skill in the art also recognize that other financial transactions and instruments may also be used, including, but not limited to, prepaid cards, and debit cards.

Figure 2:
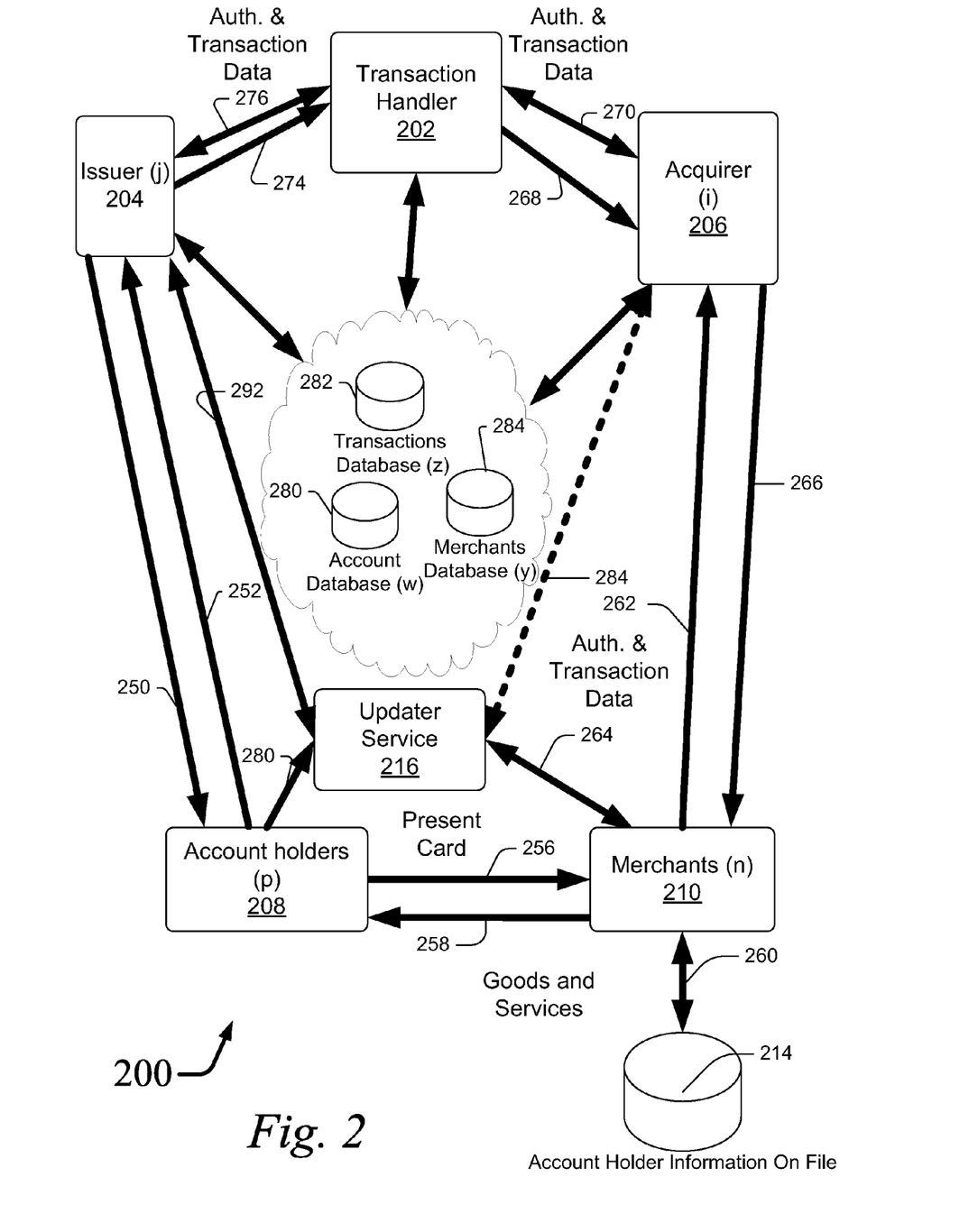
FIGS. 2 illustrates an exemplary process for providing customer generated account information updates to merchants for use in a financial services transaction (i.e.; credit card transactions)

FIG. 2 depicts an exemplary process 200 for a transaction to be process similar to that of process 100 described above with respect to FIG. 1. Whenever account holder (p) 208 has account information to update, account holder (p) 208 accesses an updater service 216. Account information updates can originate with account holder (p) 208 or with account holder's 208 issuer (j) 204. The issuer (j) 204, for example, may supply new account number for a payment device in the case of theft or loss of the payment device or the issuer may reissue the same payment device with an updated expiration date. In the case of an update originating at issuer (j) 204, the updated account information is given to account holder (p) 208 along path 250. An account holder (p) 208 may originate new account information, for example, when the account holder's 208 name or address changes. In the case of an update originating with an account holder, in one implementation, the account holder (p) 208 will provide the updated account information to issuer (j) 204 along path 252 and issuer (j) 204 will confirm that information along path 250. In another possible embodiment, account holder (p) 208 may provide account holder originated updates to issuer 204 through the updater service 216 along path 292.

Updater service 216 can be a web service, a widget in a desktop application, a functionality built into a kiosk or a Point of Service terminal (POS), an extension to an existing account management system, a functionality built into an automatic teller machine, or other similar user interface known to those of skill in the art. Updater service 216 can be operated, maintained, and housed by a merchant (n) 210, an Issuer 204, a transaction handler 202, an acquirer (i) 206, or any trusted third party entity (not shown). For example, account holder's 208 issuer 104 may support an online account management web service.

The web service includes a web interface that supports the updater service 216 together with other known account management features such as account balance lookup, bill payment, account history information, new account creation or existing account cancellation. In the general case, the updater service 216 is a secured feature that requires the account holder (p) 208 to authenticate their identity.

Once authenticated, an account holder (p) 208 selects one or more payment devices registered with the updater service 216. The registered payment device list on the updater service 216 represents some or all of the account holder's 208 payment devices known to the updater service 216. In order to register a payment device, the updater service 216 either has a connection to the account holder's 208 issuer (j) 204 that provides a list of some or all of the account holder's 208 payment devices, stores account information about payment devices in a database (not shown) that account holder (p) 208 has previously registered with the updater service 216, or requests that the account holder 204 resupply updated account information upon each use of the updater service 216. It should be noted that information stored at the updater service 216 might have been presented when an account holder (p) 208 registered for the account updater service 216 or when the account holder (p) 208 registered with the hosting entity (the issuer (j) 204, the transaction handler 202, or the merchant (n) 210). In addition, the updater service 216 can connect to one or more issuers 204 to obtain a list of account holder's 208 payment devices by querying for such information along path 282 using the account holder's 208 provided information, by querying partnering issuer (j) 204. The updater service 216 can be used with any type of payment device mentioned earlier including credit cards, prepaid cards, mobile devices, and single logon services.

The updater service 216 then requests that the account holder (p) 208 supply updated account information. Certain information such as name, phone number, mailing address, and billing address may be of general applicability to all payment devices. Other information such as account number, expiration date, and personal identification number may be applicable only to individual payment devices or payment devices somehow associated with an individual payment device (as is the case in a joint account). The updater service 216 provides user writable fields (as shown in FIG. 4, for example) that the account holder (p) 208 completes when the account holder's 208 account information requires updating.

The updater service 216 then prompts the account holder (p) 208 to select from among a list of merchants that identifies information about one or more merchants (n) 210. The list of merchants can be generated in a number of ways. The merchants can be a list of those merchants (n) 210 that are also subscribers of the updater service 216, a list of merchants (n) 210 with known accounts on file databases, a list of merchants (n) 210 generated from the transaction history of account holder (p) 208 and supplied by issuer (j) 204, or a list previously created by account holder (p) 208. In addition, the updater service 216 may provide another user writable field so that account holder (p) 208 may provide information about merchants that are found within the generated list.

Once the account holder (p) 208 has supplied the updated information fields, has selected the appropriate payment devices, and has selected from among a list of merchants, the updater service 216 may verify the information with the account holder's 208 issuer along path 282. The applicable issuer (j) 204 will confirm that the information supplied by account holder (p) 208 is consistent with the account information about a particular payment device stored with the issuer (j) 204. In addition, as mentioned above, when account holder (p) 208 initiates an update, the updater service 216 may also be responsible for supplying the updated account information to the issuer (j) 204. In this case, an issuer (j) 204 may accept some or all of the supplied information as update information. In particular, issuer (j) 204 may permit user generated changes to mailing address, but not changes to other account information like expiration date or an account number.

Once verification is complete (if performed at all), the updater service 216 will provide the updated account information for delivery to the selected merchants (n) 210. This information can be provided in real time to selected merchants, queued in a batch delivery system sent to merchants (n) 210 via the updater service 216 (push), requested at the time of the next transaction by a merchant (n) 210 (fetch), or delivered via another data push or data fetch system. In one implementation, the updater service 216 will maintain both old and new account information. When the updated account information is pushed to merchants (n) 210, the updated account information is sent together with the old account information merchant (n) 210 then updates the account information in its account holder information on file database 214 by querying using the old account information and updating the corresponding record using the updated account information. In another implementation, a merchant (n) 210 may check account information about account holder (p) 208 by first obtaining the existing information from merchant's 210 account holder information on file database 114 and sending the account information to the updater service 216 along path 264. The updater service 216 uses the supplied account information to query for any updated account information and, if updated account information is found, the updater service 216 will return the new account information to merchant (n) 210 along path 216. The merchant (n) 210 will store the updated account information in its account holder information on file database 114 and will use the updated account information in its transaction with acquirer (i) 206.

For an example of the foregoing, the VisaNet™ credit network services includes a product which provides account information updates and provides these updates to participating merchants who inquire about their customer's future transactions for which customer account information is kept on file by the merchant, for instance 'card-on-file' type customers. This service and exchange of information occurs in batch processes. In another example, merchant (n) 210 may confirm account information about account holder (p) 208 at the time the next transaction occurs.

Another implementation of process 200 permits an acquirer (i) 206 to receive the transmission of updated account information from the updater service 216 along optional path 284. In this case, when an account holder (p) 208 selects one or more merchants (n) 210 from the list generated by the updater service, the updater service associates the merchant's 210 acquirer (i) 206 with the destination data rather than the merchant directly. When the account holder (p) 208 submits the updated account information, the updated information is either transmitted directly to acquirer (i) 206 or stored for batch processing or for on demand updates If the system is capable of real-time transmission, the acquirer (i) 206 will promptly receive the updated information. Once the updated information is received, the acquirer (i) 206 may push the updated information to its merchants (n) 210. Or, where the system permits 'on-demand' update requests, the acquirer (i) 206 can push the updated account information to merchant (n) 210 in response to an attempted transaction involving the out of date account information. That is, the merchant (n) 210 may initiate the transaction (such as a periodic payment) that is sent to the merchant's 210 acquirer (i) 206. Since the merchant (n) 210 does not have the updated information, the transaction begins with out of date account information, but the acquirer queries for updates, and when an update is available, the merchant (n) 210 uses the updated account information to complete the transaction. In addition, the acquirer (i) 206 will return the updated account to merchant (n) 210. The merchant (n) 210 will then update the merchant's 210 account holder information on file database 214.

In another implementation, and referring to FIG. 2, the account holder (p) 208 makes input to a user interface which is used to access one or more account databases (w) 280 to retrieve one or more of the account holder's accounts and attributes of each account. Optionally, this access may be permitted only upon an authentication of the identification received from the account holder.

Another aspect of the user interface is displayed with a user selectable account list populated with the retrieved account holder's accounts. The account holder (p) 208 makes input to the user interface and a selection of one of the account holder's accounts is received from the user interface. Using the selected account, access is made to one or more transaction databases (z) 282 to retrieve a list of transactions that were conducted on the selected account. Using the retrieved list of transactions, one or more merchant databases (y) 284 are accessed to retrieve a list of merchants corresponding to the retrieved list of transactions.

Another aspect of the user interface is displayed with a user selectable merchant list populated by the retrieved list of merchants and a user editable field for each of the attributes of the selected account. The interface receives input that includes, for each merchant in the retrieved list of merchants, and for each of the one or more of the attributes of the selected account, an indicator whether to send an update of the attribute to the merchant. For each received indicator from the user interface, a transmission if formed to contain information that includes the corresponding update of the attribute. The information is for delivery to the corresponding merchant. The information can also include a notice that the update of the attribute is to be stored by the corresponding merchant in an account on file database 214.

Figure 3:
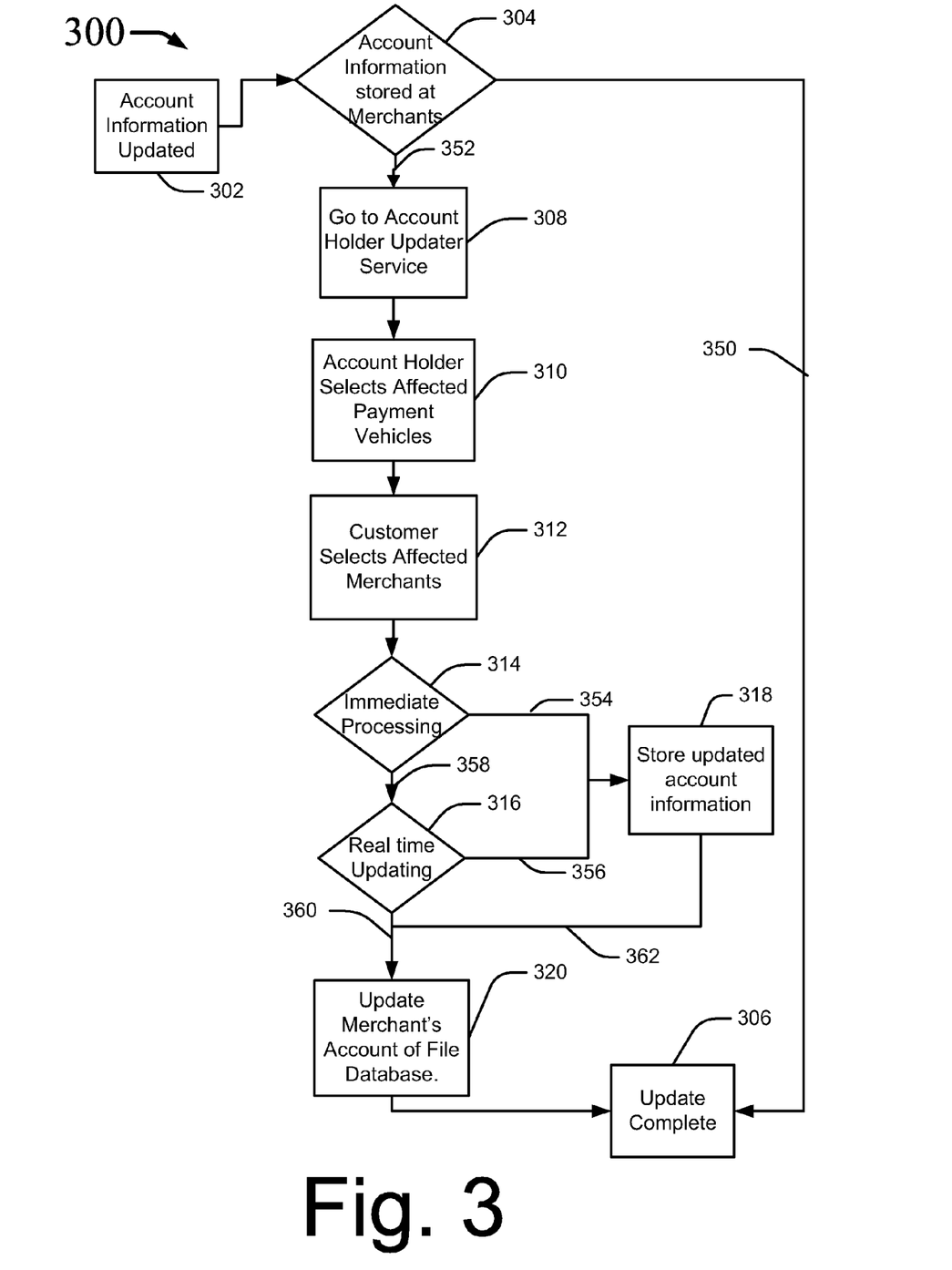
FIG. 3 depicts an exemplary process for an account holder to update a merchant's accounts-on-file database.

FIG. 3 depicts an exemplary implementation of a process 300 to update account information. Process 300 begins when there is an account information update 302. An account information update can be any update to an account holder's account information including change in account number, expiration date, mailing or billing address, name, or other properties like enhancements. The account information update can be initiated by an account holder or by an account holder's issuer. When account information is updated, the original account information may be stored at one or more merchants. It is desirable to process subsequent transactions with the updated account information so that each such subsequent transaction will be correctly processed.

A query is made at 304 as to whether an account holder's information is stored at one or more merchants. If so, then process 300 moves to step 308 such that an account holder may proceed to an updater service 308 along path 352. However, when the account information is not stored with a merchant, or where an account holder decides not to utilize the updater service, process 300 continues along path 350 to the update complete step 306.

At the account holder updater service 308, the account holder proceeds to select one or more affected payment devices 310 and one or more affected merchants 312. The updater service also accepts as input the updated account information associated with each payment device that is destined for delivery, in whole or in part, to each selected merchant. After completing all the necessary fields, progress continues to decision box 314. Decision box 314 checks whether the user has selected immediate processing and whether the transaction system permits immediate processing. If either is no, process 300 proceeds along path 354 where the updated account information is stored for updating later at 318. Updated account information can move from 318 to 320 along path 362 upon initiation of a push or fetch system. For example, the updater service may push the updated account information periodically to merchants along path 362 in periodic batches. Or, merchants can fetch updated information stored at the updater service and held at step 318 upon initiation of the next transaction with the account holder. In that case, the updated account information flows along path 362 only when requested by a merchant.

In the case that immediate processing is possible, as determined at query 314, process 300 continues along path 358. Decision 316 checks whether the system permits real-time processing. If the system does not permit real-time processing, preprocess 300 continues along path 356, where the updated account information is stored for later processing, as described above. Where real time updating is permitted, process 300 continues along path 360. The updater service supplies, in real time, the merchants selected at step 312 with the updated account information for the applicable payment devices selected at step 310.

When merchants receive the updated account information, either by transmission path 360 or transmission path 362, the applicable merchants use the updated account information to update their accounts on file database. A merchant will query the database using the existing account information and then update the database record with the supplied updated account information. Once the update is complete process 300 moves to step 306, and a merchant will use the updated account information for a subsequent transaction involving that account holder.

Figures 4A, 4B:
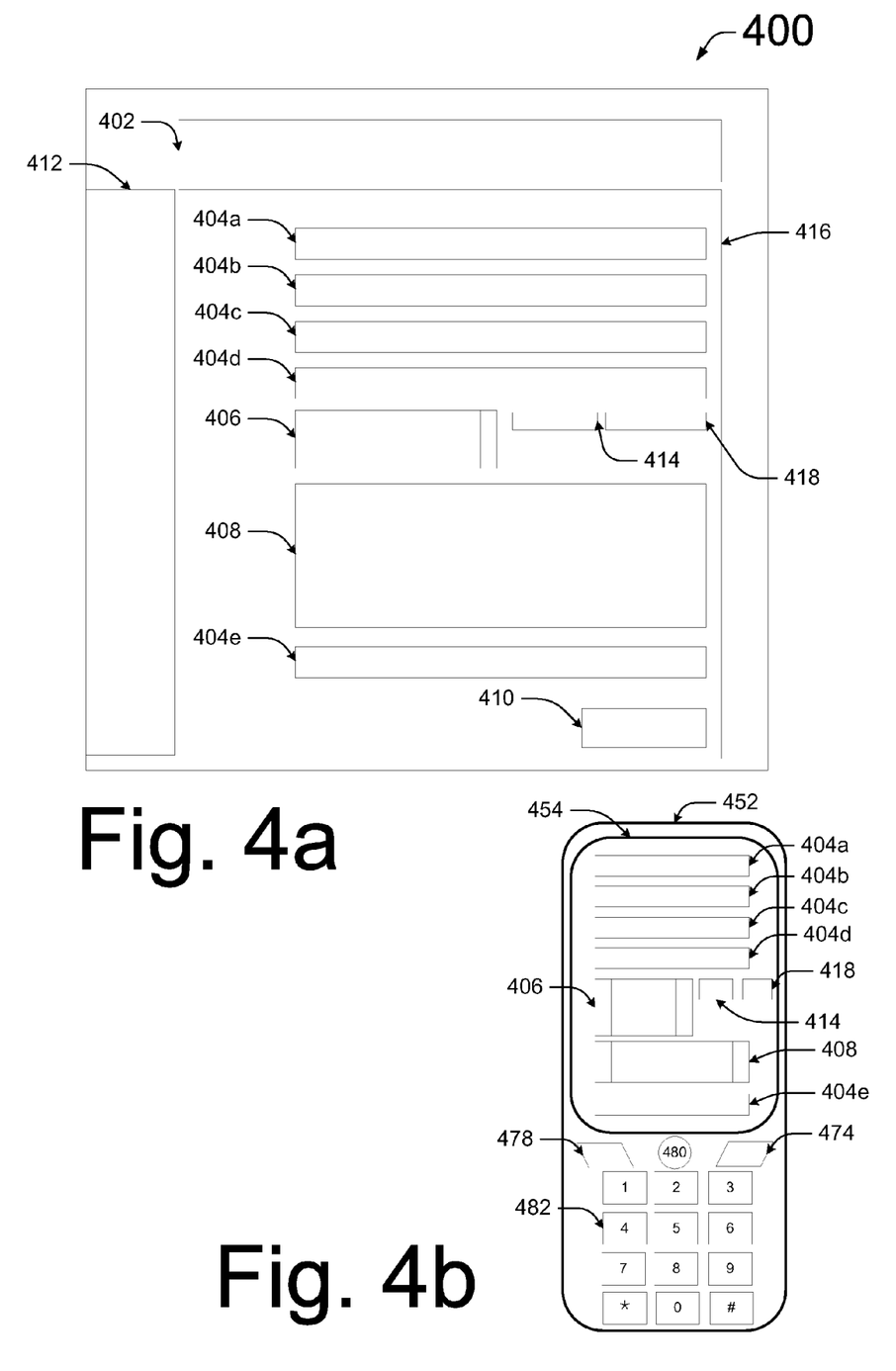
FIG. 4a depicts an exemplary user interface implementing an account updater service.
FIG. 4b depicts an exemplary implementation of a user interface on a mobile device.

FIG. 4a illustrates an exemplary user interface 400 implementing part of the user experience of the updater service described above. The user interface 400 could be implemented in conjunction with a web service, at a kiosk, as a functionality offered at an automated teller system, or in any environment capable of presenting a visual and interactive user interface. The user interface 400 could use traditional mouse and keyboard interactions, touch screen, voice prompts, mobile device predictive text, or other known interface functionality.

The user interface 400 has three basic areas: branding header 402, navigation 412, and user form 416. Branding header 402 permits the user interface 400 to be branded or co-branded to the user. Branding header 402 may include one or more logos, possible header level navigation as is customary in the field, and other identifying information. The branding header 402 is shown at the top of the screen could appear in various locations of various sizes, or be entirely removed (such as the case may be when the user interface 400 is implemented in an already branded kiosk or when the user interface 400 is implemented in an environment with limited visual real estate).

Navigation 412 is a panel containing user interface navigation such as vertical and horizontal scrolling functionality. The navigation 412 may provide access to one or more other areas of the user experience, may describe the present location in the user experience, may provide other helpful information to the end user, or may be entirely eliminated from the user interface 400. The navigation 412 shown can be in many possible locations. Other locations include at the footer and on the right of the user interface 400. The navigation 412 is entirely optional to the current invention, and in certain environments and user experiences having limited visual real estate impracticable.

User form 416 illustrates a generic user experience for the updater service. It contains a plurality of user form fields: 404, 406, 408, 410, 414 and 418. As shown 404a-e, 414 and 418 are text boxes, 406 and 408 are select boxes or combination boxes, and 410 is a button.

Text boxes 404a-d, for example, can be data entry fields that permit the end user to provide text information. Text boxes for 404a-d can be boxes for the input and/or update to an account holder's personal information, such as name (404a), billing address (404b), mailing address (404c), and phone number (404d). User interface 400 can also include a number of other optional text boxes (not shown) that are used to provide other free form information, such as a personal identifier or password and a response to a security question. Text box 404e can be used to supply merchant information not listed in a merchant select box 408. Text boxes 414 and 418 can be shown in reoccurring pairs on form 416 so as to provide functionality for a repetition for each payment device selected in merchant select box 406 for the purpose, for instance, of supplying a new expiration date or a new account number. The text boxes may be linked to one or more validation routines. For example, the user interface 400 may have transparent functionality that validates input made to the expiration date text box 414 and provided by the user so that the input will be assured of being a proper date. The text boxes shown in form 416 are shown as single line text boxes for simplicity, but the text boxes may be multiline text boxes or may be comprised of more than one text boxes (such as, for example, an address entry may be comprised of street address, city, state and zip code boxes).

Payment device select box 406 is a drop down or combination box that lists some or all of a user's payment devices. Select box 406 is populated with a list of a customer's payment devices generated either by the updater service when the user interface loads or by input supplied by the customer. The select box 406 allows a user to select one or more items from the list. If implemented as a combination box, a user may also type in information directly and that information is added to the select box. When a payment device is selected by the customer from the payment device select box 406, the user interface 400 may display the current account number and expiration date in the text boxes 414 and 418, respectively. The account information or expiration date is part of the updated account information; the user may then input the updated account number and expiration date in the associated text box.

By selecting one or more payment devices from the select box 406, the user indicates that the generally applicable updated account information, such as name, address, and phone number, should be updated with respect to those selected payment devices. Unselected payment devices will not receive any of the updates supplied during the current user session.

Merchant select box 408 is a list of one or more merchants. The list of merchants can be generated by the updater service when the user interface loads, dynamically when the user selects one or more payment devices, or by the user if the select box is implemented as a combination box that allows the user to supply text data directly to the select box. The list may be comprised of all merchants that are participants in the updater service, all the merchants that store the current customer's account information in an account holder information on file database, a list of all known merchants that have an account holder information on file database, or some combination of these lists. In particular, the merchant list could be generated based on the customer's spending habits or other data mining techniques that determine that the customer regularly has periodic payments to certain merchants.

If a merchant is not listed, the user interface 400 may permit a customer to supply the information for an unlisted merchant. As mentioned above, this may be implemented by using a combination box in which the user can type text information into a select box directly. Alternatively, new merchant information can be supplied by one or more text boxes 404e. Text boxes 404e can be simple text boxes or a series of text boxes or multiline text boxes in which the user can enter the unlisted merchant's information. Additional merchants and merchant information could also be supplied by a popup (not shown) or another screen (not shown) that prompts the user to supply necessary information, such as a merchant's name, address, etc. If the updater service operates on a subscription model in which merchants must subscribe to the updater service, a merchant may be contacted directly either online or offline, where the contact informs the merchant that updated account information exists and solicits a subscription to the service.

Once the user has supplied all the updated account information, has selected the payment devices to update, and has selected the applicable merchants, the user then may submit the form to the updater service by activating a button 410. The button 410 may be a web form button that is embedded directly into the user form 416 (as shown) or may be a hardware button affixed to kiosk, mobile device or ATM. A user may also be able to submit the data entered into the user form 416 by pressing the enter or return key on a keyboard and bypassing the button 410 entirely.

Once the information has been submitted, the updater service may validate the information. In the case of a client server model, the updated account information is sent from the client to the server under the control of the updater service. The updater service then may validate the information supplied. The validation can be simple validation such as confirming the validity of a phone number, a date, and a zip code and associated address. The updater service can also perform complex validation, such as submitting the information to the account holder's issuer to confirm the accuracy of the update, including when changes have been made to the account numbers and/or expiration dates. If any of the updated account information fails validation, a user may be prompted with a user interface similar to user interface 400, where the prompt highlights a diagnostic conveying that the updated account information has failed to validate. If validation is successful (if it occurs at all), then the updater service prepares the updated account information for delivery to the selected merchants as described in greater detail above.

The updater service user interface 400 may also have other features and functionality not shown in FIG. 4a. The user interface can consist of a series of pages vs. a single page. The user interface could also be a portlet or widget that could be embedded into any issuer, merchant, or partner website. The user interface 400 could include optional fields that permit the user to delay the effective date of an update. In this case, the information would not be released to the selected merchants until the selected effective date. For example, a user may be aware of a move occurring next week, so the user provides the updated billing address now, but instructs the updater service to delay sending out the updated information until after the move. Similarly, an issuer may have provided a user with a new payment device before the current payment device is set to expire, so a customer might provide the new account information and expiration date but delay the effective date until the old account expires.

While user interface 400 is directed primarily to providing updated account information to merchants through the updater service, user interface 400 can also be used to supply updated account information to an account holder's issuer. In that case, when a user submits the updated account information, an issuer may accept changes to certain payment device properties such as a mailing and billing address. Thus, a user can use the updater service as a single point of communication regarding changes to personal information for both issuers and merchants.

In yet another implementation, user interface 400 could include discretionary fields (not shown) that permit a user to request changes to a payment devices properties. These changes could include increases in credit limit, changes to rewards or enhancements, changes in payment due dates, addition of additional authorized users, and other changes that may require approval of the issuer. In one implementation, a transaction may fail at a Point of Service terminal (POS) when an account holder attempts to conduct a transaction that will result a loan being given that is over the account holder's credit limit. When the transaction authorization fails, a customer may be prompted by the updater service at the POS to request an extension of credit (in the case of a credit card or similar payment device) or for the deposit of additional funds (in the case of a prepaid payment device) for the particular payment device. The updater service notifies the issuer and awaits authorization for the updated information. If authorization is received, the information is immediately directed to the affected merchant and the information is queued for any other merchants selected for the updater service.

FIG. 4b shows an implementation of a mobile updater service user interface 454 as used on a portable device 452. Portable device 452 can be a mobile phone, a smart phone, a wireless device, a mobile payment device, or another similar device known to those skilled in the art. Portable device 452. The mobile updater service user interface 454 is capable of showing one or more form fields.

In this case, the portable device 452 shows only the form fields 404, 406, 408, 414, and 418. An end user uses the portable device's 452 user interface (in this case a series of keys 474, 478, 480, and 482) to enter information into the form fields. The portable device 452 may also include special purpose keys such as a navigation wheel 480, send button 478 and cancel button 474 that may assist the end user in completing the form fields.

A portable device 452 may be registered with the updater service. A user accessing the updater service may then be presented with a simple password for authentication purposes. After authentication (if any), as in the general embodiment described above, the user completes text boxes 404 with account information to be updated. The user selects one or more payment devices from select box 406 and the merchants to whom the information will be sent in select box 408. The user can then use a general purpose button, such as the send button 478, to send the updated information for verification and validation.

It should be noted that while FIGS. 4a and 4b show the form fields static on a single screen, the form fields could be dynamically added to the screen or spread across one or more separate screens.

Figure 5:
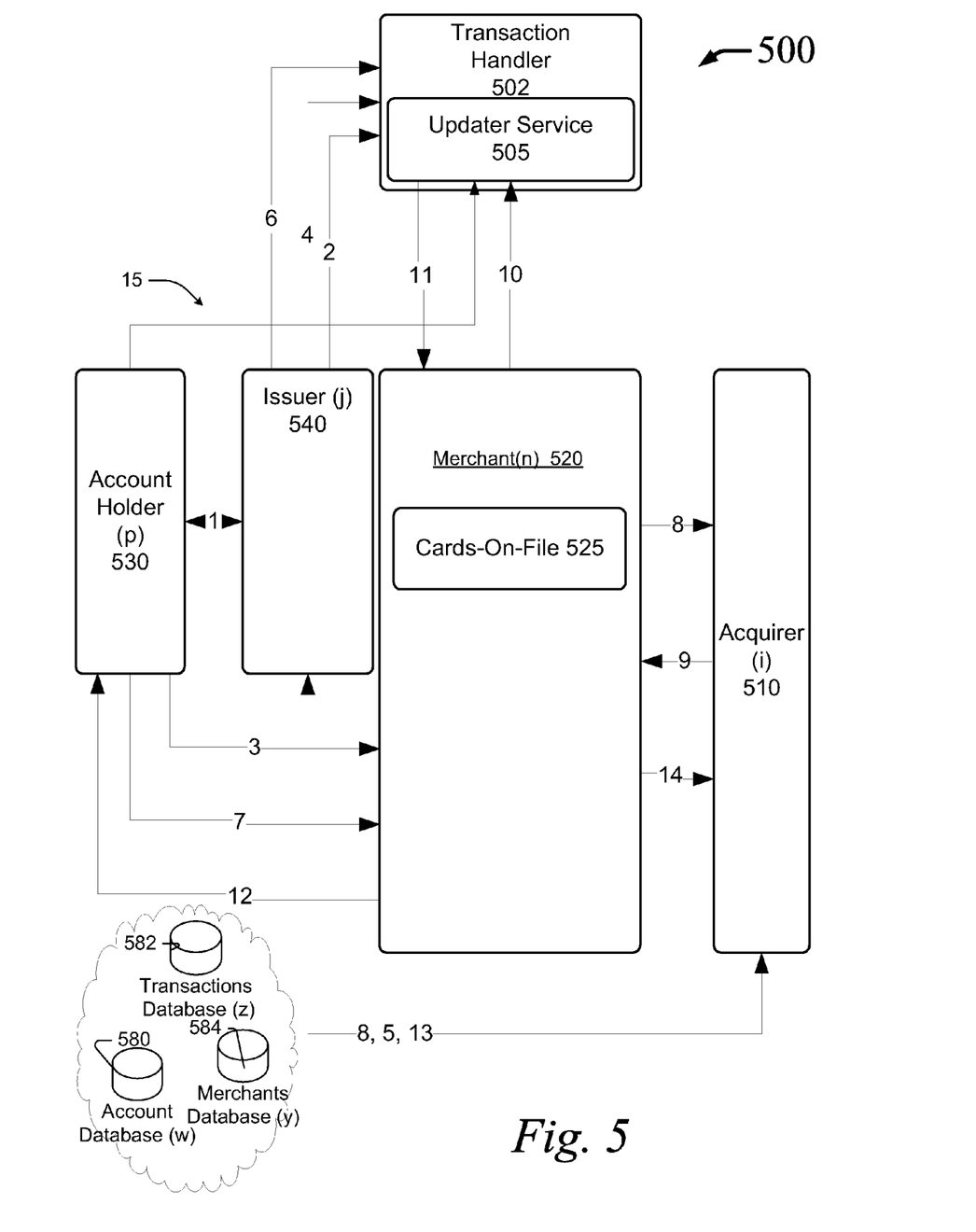
FIG. 5 illustrates an exemplary process for providing updated account information to merchants with an account holder's account information-on-file.

FIG. 5 illustrates an exemplary process in which a system updater described above can be operational where an updater service 505 is stored and maintained at a transaction handler 502. Process 500 includes the transaction handler 502 coordinating credit accounts with each issuer (j) 540 that issues each credit account to an account holder (p) 530. Each merchant (n) 520 can accept the credit card of the account holder (p) 530 for the purchase and sale of goods and services in a credit transaction using the account of the account holder (p) 530. Each merchant (n) 520 can also store account information about the credit cards of the account holders 530 in a cards-on-file storage 525. For the purchase and sale of goods and services in a credit transaction using the account of the account holder (p) 530, merchant (n) 520 initiates an authorization of same with the merchant's acquirer (i) 510 who engages in a related communication with the issuer (j) 540 of the account of the account holder (p) 530. Upon authorization of the credit transaction, the merchant (n) 520 completes the purchase and sale of goods and services with account holder (p) 530.

System 500 represents a plurality of accounts held by account holders (p) 530 in which each issuer (j) 540 issues respective accounts to the account holders (p) 530. Account holders (p) 530 conduct one or more transactions at merchants (n) 520. Each merchants (n) 520 may store the account information for the account holders' (p) 53—accounts in their cards-on-file storage 525. Merchants (n) 520 receive requests to conduct one or more subsequent transactions by the account holders (p) 530. Each acquirer (i) 510 receives from the merchant (n) 520 a request for authorization of the transaction for credit. This request may be granted or denied after the acquirer (i) 510 communicates with the corresponding issuer (j) 540. The transaction handler 502 coordinates each account for each account holder (p) 520 with the issuers 540 and the acquirers 510. The transaction handler 502 periodically receives updated account information from each respective issuer (j) 540 regarding its account holders (p) 530.

An account holder (p) 530 can provide merchant (n) 520 updated account information for use with the merchant (n) 520 cards-on-file storage 525 by using the updater service 505, which may be stored at transaction handler 502. Updated account information is transmitted from the updater service 505 to each applicable merchant (n) 520 directly upon update by the account holder (p) 530 or when an update is requested by a merchant (n) 520.

Each merchant (n) 520 can optionally request the execution of a batch process that determines changes that have been made to accounts kept in cards-on-file storage 525. The optional batch process may be initiated by the merchant (n) 520 or by the merchant's (n) 520 acquirer (i) 510. In the first case, the merchant (n) 520 transmits a list of all accounts in its cards-on-file storage 525 to the updater service 505 and the updater service 505 returns a list of updated account information. In the latter case, the merchant (n) 520 transmits to the merchant's acquirer (i) 510 a list of all accounts in its cards on file storage 525 to determine changes to the cards-on-file storage 525, and the merchant's acquirer (i) 510 transmits the request to the updater service 505. Using the account information transmitted to the updater service 545, the updater service 505 queries for changes to the accounts provided by account holder (p) 530, and the updater service 505 provides updates to the account information that match in the old account information stored in the cards-on-file storage 525. The results are sent back directly to the merchant (n) 520 or indirectly to the merchant (n) 520 through its acquirer (i) 510. The optionally requested batch update process for cards-on-file storage 525 is an implementation having optional features that are left to the entity that assembles or otherwise integrates the various components of system 500.

System 500 illustrates work flows 1 through 14. Work flow 1 represents the issuance of a credit account to an account holder (p) 530 by an issuer (j) 540. Work flow 2 represents the communication of information about that account holder's (p) 530 issued account to the transaction handler 502. At work flow 3, the account holder (p) 530 provides information to a merchant (n) 520 for storage in a cards-on-file storage 525 incident to a request for a credit transaction for the purchase and sale of goods or services.

Work flows 4 and 6 each represent a separate communication from the issuer (j) 540 to the transaction handler 502 that something has changed on the account of the account holder (p) 530. Neither of these changes is communicated to the merchant (n) 520 for storage in the cards-on-file storage 525. Subsequently, account holder (p) 530 accesses the updater service 505. Work flow 15 represents the communication of updated account information to the updater service 505. In work flow 15, the account holder (p) 530 can authorize that one or more merchants (n) 520 receive the updated account information.

Work flow 5 shows a request for a credit transaction with the merchant (n) 520 after changes are made to the account information. The request is followed by work flows 8 through 9 for the authorization to extend credit on the account of account holder (p) 530. However, due to the discrepancy in the information changed at work flows 4 and 6 with the information about the account holder (p) 530 that is stored in and communicated from cards-on-file storage 525 by merchant (n) 520, merchant (n) 520 learns that the request for the authorization to extend credit is denied at work flow 9.

In response, work flow 10 illustrates the merchant (n) 520 making a demand in real time for access to the updater service 505 to check for an update to account information. If account holder (p) 520 selected the particular merchant (n) 520 as a recipient of the updated information, then the updater service can provide that merchant (n) 520 with the updated account information. Work flow 11 represents the communication back to the merchant (n) 520, and if so authorized, the transmission of the updated account information given by account holder (p) 550 at work flows 4 and 6 to the transaction handler 502 for processing by the updater service 505. Accordingly, the real time information learned by the merchant (n) 520 at work flow 11 results in the allowance of the extension of credit to the account of the account holder (p) 530, improved upon account holder service, and resulted in increased sales for the merchant (n) 520 that would have otherwise been lost.

If merchant (n) 520 receives updated account information, merchant (n) 520 can complete the requested credit transaction with account holder (p) 530 at work flow 12 and communicates same as shown by work flows 13-14 with the corresponding issuer (p) 530 and with the merchant (n) 520's acquirer (i) 510. In addition, the merchant (n) 520 updates its cards-on-file storage 525 with the updated account information returned from There may be intermittent steps in the foregoing process, some of which may occur simultaneously. For example, the acquirer 508 can initiate the clearing and settling process, which can result in payment to the acquirer 508 for the amount of the transaction. The acquirer 508 may request from the transaction handler 506 that the transaction be cleared and settled.

It should be understood that the above work flow represents only one of many possible work flows. For example, the updater service 505 could send out batch updates to merchants (n) 520 so as to prevent the initial denial of the extension of credit at work flow 9. In that case, work flow 11 occurs periodically for each merchant (n) 520 for which there is updated account information as supplied by account holder (p) 530 at work flow 15. In addition, work flow 11 may occur immediately upon the updater service's 505 receipt of the updated account information at work flow 15. That is, the updater service 505 can push updated account information to the authorized merchants (n) 520 in real time.

In another implementation, and referring to FIG. 5, the account holder (p) 530 makes input to a user interface which is used to access one or more account databases (w) 580 to retrieve one or more of the account holder's accounts and attributes of each account. Optionally, this access may be permitted only upon an authentication of the identification received from the account holder.

Another aspect of the user interface is displayed with a user selectable account list populated with the retrieved account holder's accounts. The account holder (p) 530 makes input to the user interface and a selection of one of the account holder's accounts is received from the user interface. Using the selected account, access is made to one or more transaction databases (z) 582 to retrieve a list of transactions. Using the retrieved list of transactions, one or more merchant databases (y) 584 are accessed to retrieve a list of merchants corresponding to the retrieved list of transactions.

Another aspect of the user interface is displayed with a user selectable merchant list populated by the retrieved list of merchants and a user editable field for each of the attributes of the selected account. The interface receives input that includes, for each merchant in the retrieved list of merchants, and for each of the one or more of the attributes of the selected account, an indicator whether to send an update of the attribute to the merchant. For each received indicator from the user interface, a transmission if formed to contain information that includes the corresponding update of the attribute. The information is for delivery to the corresponding merchant. The information can also include a notice that the update of the attribute is to be stored by the corresponding merchant in an account on file database 514.

Figure 6:
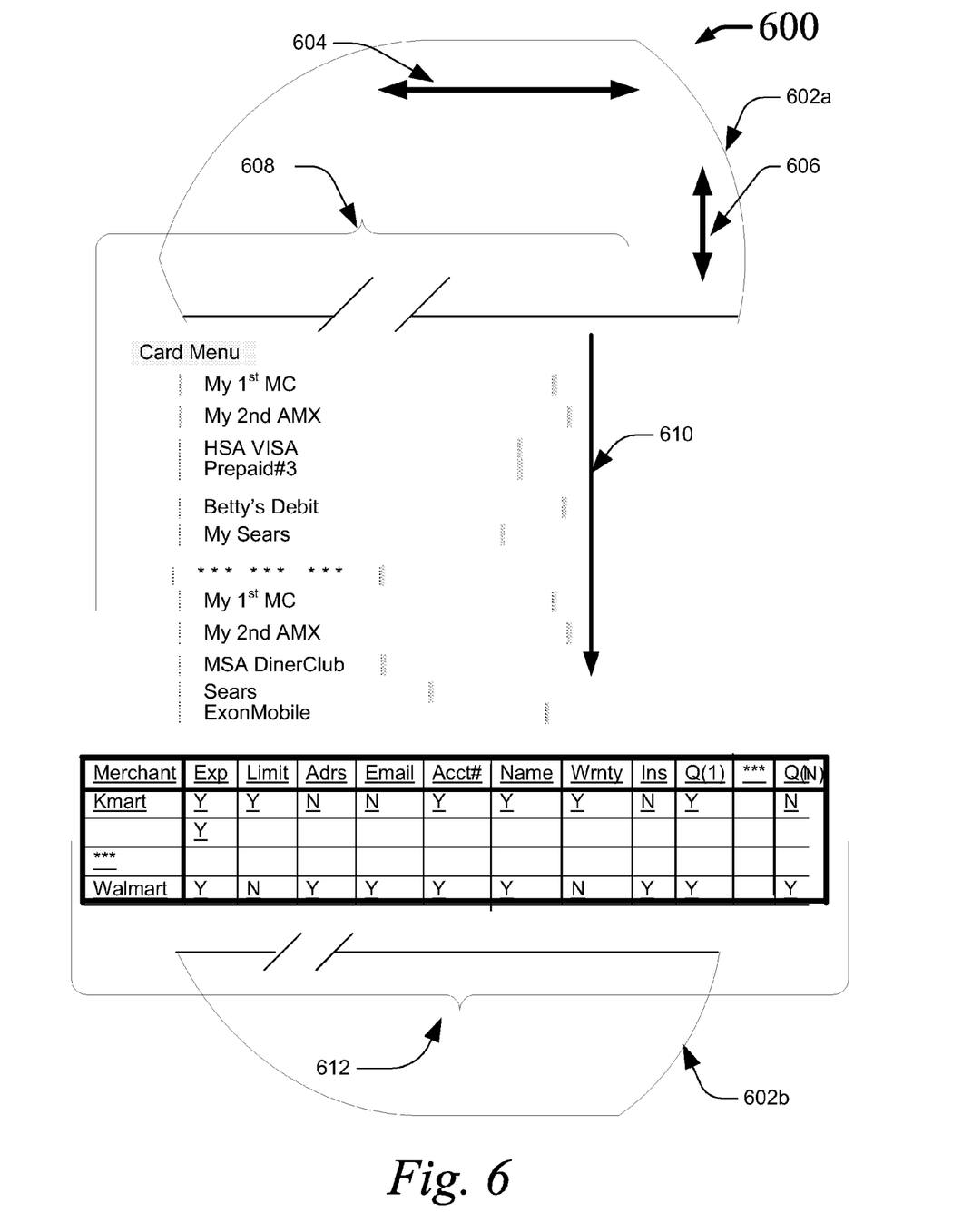
FIG. 6 depicts an exemplary user interface implementing an account updater service.

FIG. 6 shows another exemplary user interface by way of a computer screen 600. Computer screen 600 is shown in an exploded view having a top half 602A and a bottom half 602B. In the exploded view, computer screen 600 shows where one or more different parts of computer screen 600 will be located within the given real estate of a typical computer screen. To facilitate the viewing of computer screen 600, a horizontal scroll bar 604 and a vertical scroll bar 606 are seen on the computer screen 600 to indicate that the real estate is not limited by screen dimensions. By way of the scroll bars 604 and 606, an end user can move left or right, or up or down, in order to view all of the display that is rendered on computer screen 600.

Computer screen 600 contains a pull down menu 608 that allows an end user to scroll through one or more cards or other payment devices that are attributable to an account holder by using scroll bar 610. As such, one or more accounts for the card holder or account holder can be displayed in the pull down menu 608. As seen in pull down menu 608, a series of different cards or payment devices are listed including those of various brand names and card types. The list of different cards and payment devices to populate the pull down menu 608 can be generated in a number of ways. By way of example, the pull down menu 608 can be initially populated by the end user by registering the cards or payment devices at the time the end user registers for the account updater web service, or automatically by the web service provider based upon the identification of the end user and some relationship to the cards or payment devices.

For each card or payment device that the end user selects from the pull down menu 608, a table 612 on the computer screen 600 is populated with information about one or more merchants that have been previously paid using the user selected card. In particular, the table 612 shows each merchant that has been previously paid with a selected card from pull down menu 608. For example, the merchants in table 612 can be generated based on transaction histories accessible by the service relative to the selected payment device. The transaction history can be stored at an issuer, a transaction handler, and/or an acquirer. In addition, the table may further comprise one or more merchants provided directly by the end user or may be based on one or more merchants with whom the web service provider has a business relationship or partnership. An end user may provide this name and address of merchants through an extended version of the user interface seen at 600 (not shown). As such, merchants with whom transactions have not been conducted on the selected account can also be displayed in table 612 for the purpose of the end user identifying select information about the selected account to send to the user selected merchant.

As shown, table 612 can include one or more attributes of the card or payment device selected from pull down menu 608. By way of example, the table may include expiration date, credit limit or account balance, address, e-mail address, account number, name, whether the account as an attribute of warranty coverage for items purchased on the account of the merchant, whether the account as an attribute of lost or damage insurance for items purchased on the account of the merchant, or any number of additional attributes of the card or payment device selected which are listed Q(1) through Q(n).

Table 612 is used to designate changes to or updates for the cards or payment devices selected to each of the listed merchants depending on whether the end user has designated that merchant to receive the updated information by selecting a yes or a no into the table for the particular indication.

Updated information can be sent to the selected merchants in a number of ways. By way of example, the updated information can sent to the selected merchants electronically immediately following user input, either directly or via a third party processor. The merchant would receive a message or other indication noting the presence of updated account information. Or, information can be stored for batch retrieval by merchants. In that case, updated information is not sent immediately to merchants, but is stored on a server in a storage medium. The merchant can then obtain a list of all updated account information for one or more customers in a single transaction at a regularly scheduled time. Or, the information can be retrieved in real time by a merchant at the time when an account holder is conduct a subsequent transaction on the account that was updated. In this case, during or immediately proceeding the processing of that transaction, the merchant or agent thereof (i.e., the issuer, the merchant's acquirer, the transaction hander, etc.) can check for updates to attributes of the account before seeking authorization or otherwise completing the transaction upon the account.

In yet another implementation, a payment processing system, such as is seen in FIG. 1, 2 or 5, has issuers issuing accounts to account holders, where each account has one or more attributes, and the account holders conduct transactions with one or more merchants using their accounts. In this system, a user interface is provided to an account holder to input an identifier to a web service by which merchants are to receive updated information about select ones of the account holder's accounts. The updated information will typically be one or more attributes of each account that has been updated. The user interface receives the account holder's identification from the account holder, such as by the account holder, or agent thereof, inputting a social security number, an account number, a login and password, another identifier, etc. Thereafter, the received identification is used to access one or more account databases (i.e., reference numerals 180, 280, and 580 in FIGS. 1-2 and 5) to retrieve one or more of the account holder's accounts and attributes of each account. Optionally, this access may be permitted only upon an authentication of the identification received from the account holder.

Another aspect 608, and referring now to FIG. 6, of the user interface is displayed with a user selectable account list is populated with the retrieved account holder's accounts (e.g.;

My 1st MC, My 2nd MC, Prepaid#3, My Sears, MSA Diner-Club, Exxon Mobile, Betty's Debit, etc). The account holder makes input to the user interface to select one of the account holder's accounts, and that input is received from the user interface. Using the selected account, access is made to one or more transaction databases (i.e., reference numerals 182, 282, and 582 in FIGS. 1-2 and 5) to retrieve a list of transactions that were previously conducted upon the selected account. Using the retrieved list of transactions, one or more merchant databases (i.e., reference numerals 184 and 284 in FIGS. 1-2) are accessed to retrieve a list of merchants corresponding to the retrieved list of transactions.

Another aspect 612 of the user interface is displayed with a user selectable merchant list populated by the retrieved list of merchants (e.g., Kmart, Walmart, etc.) and a user editable field for each of the attributes (Exp., Limit, Adrs, Email, Acct#, Name, Wrnty, Ins, Q(1) through Q(Q), etc) of the selected account. The interface receives input that includes, for each merchant in the retrieved list of merchants, and for each of the one or more of the attributes of the selected account, an indicator (i.e., 'Y' or Yes, vs. 'N' or No) whether to send an update of the attribute to the merchant. For each received indicator from the user interface, a transmission is formed to contain information that includes the corresponding update of the attribute. The information is for delivery to the corresponding merchant. The information can also include a notice that the update of the attribute is to be stored by the corresponding merchant in an account on file database (i.e., reference numerals 114, 214, and 525 in FIGS. 1-2 and 5).

In a payment processing system of another implementation, an account holder may have one or more payment devices. Each payment device is issued by an issuer and corresponds with certain account information associated with the account holder. The account information is comprised of a number of properties including account number, account holder name, account holder address, rewards or other enhancements available to the account holder for the using the account, expiration date, and other information about their account such as payment history and account balance. From time to time, an account holder may need to update some or all of the properties of the account information. By way of example, an account holder may be issued a new account number following the loss or theft of the corresponding payment device. An account holder may also need to update address information after moving to a new location, to update their name after being married, or to remove an individual from an account following a divorce. Or, in some circumstances, changes are necessitated by an issuer, as is the case when an account holder's payment device is associated with a predetermined expiration date that suspends a non-renewed account, but which the issuer may automatically renew upon delivery and activation of an updated payment device with a new expiration date.

The account holder may provide some or all of this account information to one or more merchants. In certain circumstances, a merchant may store that account information in a database as a record for future payment processing. By way of example and not limitation, a merchant may store account information for automatic bill pay services; regular (such as monthly or annual) payment obligations for recurring services like gym memberships and television and utility bills; and irregular payments for the convenience of account holders who frequent the merchant in the case of online retailers, grocery stores, airline ticket services, rental car agencies, and gas stations. The account information stored at these merchant would become out of date whenever the account information is updated.

Similarly, where an account holder has two or more related payment devices (such as when there is a joint account or analogous payment devices), use of an older payment device might prevent the extension of credit to the account holder. One method disclosed herein would permit a merchant to extend credit to an account holder using the updated account information even if presented with an out of date payment device.

The various implementations disclosed herein can be used in one or more payment processing systems that each includes a transaction handler, such as a financial service provider, to coordinate accounts that are issued by an issuer to account holders requesting transactions with merchants. Each merchant has an acquirer with whom the transaction handler also coordinates the accounts.

In one implementation, an account holder sends a transmission to its merchant or merchants including the updated account information. The implementation can be performed by the account holder using a computer interface, such as a web service, to send a transmission directly to one or more of the account holder's merchants including a request to update the account holder's account information before another transaction occurs at that merchant. Each merchant then updates the account information provided by the account holder in the merchant's accounts on file database. When the method is performed, a transaction by an account holder at the merchant will be processed by the merchant's acquirer using the updated account information, the acquirer will authenticate and validate the transaction with a transaction handler, the transaction handler will receive a transmission from the merchant including the updated account information about the account holder, and the transaction will be processed with the updated account information.

An implementation can be performed by an account holder accessing an updater service. In this implementation, the account holder provides the updater service with updated account information. The account holder selects one or more payment devices, and selects one or more merchants. The updater service prepares a data transmission for delivery to the one or more selected merchants by forming a transmission destined for each merchant. Upon receipt, each merchant stores the updated account information in the merchant's account holder 'information-on-file' database. In one variation, the update information is submitted in real-time to each of the selected merchants. In another variation, the updated account information is stored for periodic delivery to merchants. In yet another variation, the information is remotely stored and accessible to merchants upon request.

In yet another variation, the updater service can also transmit the updated account information to an account holder's issuer. The issuer then may update the issuer's own information regarding their account holder.

In yet another implementation, an account holder may request certain discretionary changes to the payment device. The updater service will submit the request for the discretionary changes to the account holder's issuer for approval and will delay updating merchants until the issuer approves such discretionary changes.

The updater service may also issue updates for generally applicable personal information, like phone numbers, addresses and names, across one or more payment devices whether related or not.

In still another implementation, the updater service may be maintained at an issuer. In one variation, the updater service may be maintained at a transaction handler. The updater service may be accessible to the transaction handler through the internet, an intranet, a kiosk, a point of sale device, a mobile device, an automatic teller machine, or other system capable of interaction with the account holder. The updater service can be accessed as part of the functionality of an existing account services interface, as part of a personal computer desktop application, or as part of a Point of Service terminal (POS).

In another implementation, a method is performed in a payment processing system that includes a financial service provider coordinating accounts issued by an issuer to account holders requesting credit from merchants. Each merchant has an acquirer with whom the financial service provider also coordinates the accounts. The method can be performed by an updater service that receives updated account information concerning one or more payment devices directly from an account holder via a web service. The updater service provides the account information to one or more user-specified merchants or agents thereof. The updated account information is used to update the account information stored by the user-selected merchant in the merchant's account-on-file storage. The updated information can be sent in real-time, in a batch process, or during an attempt to use outdated account information when conducting a transaction on the account. If this method is used, updated information is available to the merchant for any transaction after the updated information has been received.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

The present invention can be implemented in the form of control logic, in a modular or integrated manner, in software or hardware or a combination of both. Thus, the steps of a method, process, or algorithm described in connection with the implementations disclosed herein may be embodied directly in hardware, in a software module executed by a processor, or in a combination of the two. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

Any recitation of "a", "an" or "the" is intended to mean "one or more" unless specifically indicated to the contrary.

The present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

What is claimed is:

1. In a payment processing system with issuers issuing accounts to account holders, each said account having one or more attributes, and each of the account holders conducting transactions with respective merchants using corresponding accounts of the account holders, a method comprising:

receiving, at a computing device of a transaction handler, an identification of a first said account holder;

using the received identification, at the computing device, to retrieve from an account database data about a first said account of the first said account holder, wherein the data includes an indicator of the first said account and an attribute of the first said account;

using the indicator, at the computing device, to retrieve from a transaction database a transaction history of the first said account, wherein the transaction history includes a list of past completed transactions conducted on the first said account;

using the transaction history, at the computing device, to retrieve from a merchant database a list of a plurality of said merchants that have each engaged in at least one of the past transactions upon the first said account;

transmitting, at the computing device, the data retrieved from the account database and the list of the plurality of said merchants for rendition of each on a display;

receiving and storing, at the computing device:
an update of the attribute provided by the first said account holder; and
a selection of the first said account holder of at least one said merchant from among the list of the plurality of said merchants that is to receive the update of the attribute;

forming, at the computing device, a transmission for delivery to the issuer of the first said account, the transmission including:
the update of the attribute of the first said account provided by the first said account holder; and
a request for the issuer of the first said account to validate the update of the attribute;

receiving, at the computing device, a transmission from the issuer of the first said account including a validation of the update of the attribute; and forming, at the computing device, a transmission including the corresponding said validated update of the attribute, wherein the update is for delivery to the selected at least one said merchant.

2. The method as defined in claim 1, further comprising sending a notice that the update of the attribute is to be stored by the selected at least one said merchant in a cards-on file storage device of the selected at least one said merchant.

3. The method as defined in claim 1, further comprising authenticating the identification prior to forming the transmission including the corresponding said validated update of the attribute.

4. The method as defined in claim 1, wherein the transaction database includes a plurality of transaction databases each corresponding to a different said transaction handler that processes at least one of the transactions of the corresponding said merchants upon the corresponding accounts of the account holders.

5. The method as defined in claim 1, wherein the first said account is among a plurality of said accounts each issued to the first said account holder by a different said issuer.

6. The method as defined in claim 1, wherein the merchant database includes a plurality of merchant databases each corresponding to a different said transaction handler that processes at least one of the transactions of the corresponding said merchants upon the corresponding accounts of the account holders.

7. The method as defined in claim 1, further comprising receiving and storing, at the computing device, an indication of the first said account holder of at least one said merchant from among the list of the plurality of said merchants that is not to receive the update to the attribute.

8. The method as defined in claim 1, further comprising receiving and storing, at the computing device, an instruction of the first said account holder to delay an effective date of the update.

9. The method as defined in claim 1, further comprising receiving, at the computing device, the update to the attribute from the issuer of the first said account.

10. The method as defined in claim 1, wherein:
receiving the identification;
using the received identification;
using the indicator;
using the transaction history;
transmitting the data retrieved;
receiving and storing the update of the attribute and the selection; and
forming the transmission for deliver to the issuer of the frist said account;
receiving the transmission from the issuer of the first said account; and
forming the transmission including the corresponding said validated update of the attribute, occur in succession in a batch process.

11. The method as defined in claim 1, wherein the update of the attribute and the selection are received from a POS terminal.

12. The method as defined in claim 1, further comprising receiving and storing, at the computing device, a selection of the first said account holder of a second said merchant that is not among the list of the plurality of said merchants.

13. The method as defined in claim 1, wherein the update of the attribute further comprises a change in mailing or billing address.

14. The method as defined in claim 1, further comprising:
transmitting, at the computing device, a list of accounts of the first said account holder for rendition on the display, wherein the list of accounts includes the first said account; and
receiving, at the computing device, a selection from the first said account holder of the first said account for updating.

15. The method as defined in claim 14, wherein the list of accounts is displayed in a pull down menu that can be scrolled by the first said account holder using a scroll bar.

16. The method as defined in claim 14, wherein the list of accounts is provided by the first said account holder to the transaction handler during a registration process.

17. The method as defined in claim 14, wherein the list of accounts is provided by one or more issuers to the transaction handler.

18. In a payment processing system with issuers issuing accounts to account holders, each said account having one or more attributes, and each of the account holders conducting transactions with respective merchants using corresponding accounts of the account holders, a method comprising:
receiving, at a computing device of a transaction handler, a first transmission including an identification of one said account holder and each corresponding indicator of a plurality of said accounts that are each issued to the one said account holder by a different said issuer;
using, at the computing device, each of the received said indicators to retrieve data about corresponding past said transactions conducted upon the plurality of said accounts issued to the one said account holder;
retrieving, at the computing device, a list of a plurality of said merchants that engaged in the past said transactions;
transmitting, at the computing device, information for rendition to the account holder via a user interface, the information including a query requesting the one said account holder:
to provide an update to an attribute of each of the plurality of said accounts;
to identify said merchants among the list of the plurality of said merchants that are to receive at least one said update; and
to identify said merchants among the list of the plurality of said merchants that are not to receive at least one said update;
receiving, at the computing device, a second transmission including at least one said update provided by the one said account holder, the identified said merchants that are to receive the at least one said update, and the identified said merchants that are not to receive the at least one said update;
forming, at the computing device, a third transmission for delivery to one said issuer, the transmission including:
the update to the attribute of a corresponding said account issued to the account holder by the one said issuer; and
a request for the one said issuer to validate the update to the corresponding said account;
receiving, at the computing device, a fourth transmission from the one said issuer including a validation of the update by the one said issuer; and
forming, at the computing device, a fifth transmission containing the validated said update for delivery to each identified said merchant that is to receive the validated said update.

19. The method as defined in claim 18, further comprising using, at the computing device, the identification to authenticate the account holder prior to forming the third transmission.

20. The method as defined in claim 18, wherein each said account is associated with a different said transaction handler that processes corresponding said transactions upon the each said account.

21. The method as defined in claim 18, further comprising receiving and storing, at the computing device, an instruction of the first said account holder to delay an effective date of at least one said update.

22. The method defined in claim 18, wherein the fourth transmission further includes another said update to another said attribute of the corresponding said account, wherein the another said update is:
provided by the one said issuer; and is different from the update received in the second transmission.

23. A non-transitory computer readable medium comprising stored instructions that, when executed by a computing device perform the steps of:
   receiving, in a batch process:
      a selection from an account holder of at least one merchant from among a list of a plurality of said merchants; and
      a request from the said account holder to update an attribute of each of a first account and a second account wherein the update is provided by the account holder, and wherein:
   the first account:
      is issued to the account holder by a first issuer; and
      is associated with a first transaction handler that processes transactions upon the first account; and
   the second account:
      is issued to the account holder by a second issuer that is different from the first issuer; and
      is associated with a second transaction handler that:
         is different from the first transaction handler; and
         processes transactions upon the second account;
   forming a first transmission to each of the first issuer and the second issuer, each said first transmission including a request to validate the corresponding said update;
   receiving validated corresponding said updates from each of the first issuer and the second issuer; and
   for each received validated corresponding said update:
      storing, at the computing device, the validated corresponding said update; and
      notifying the at least one said merchant that the validated corresponding said update is to be stored by the at least one merchant in a cards-on-file storage device for use in a future transaction between the at least one merchant and the account holder.

24. The non-transitory computer readable medium as defined in claim 23, wherein the request further includes an indication of the account holder of at least one said merchant that is not to receive at least one of the updates.

25. The non-transitory computer readable medium as defined in claim 23, wherein the request further includes a request of the account holder to delay an effective date of at least one of the updates.

26. The non-transitory computer readable medium as defined in claim 23, wherein the computer readable medium comprises further stored instructions that, when executed by a computing device performs the step of further receiving at least one of the updates to the attribute from at least one of:
   the first issuer; and
   the second issuer.

* * * * *